United States Patent
DeChristopher

(10) Patent No.: US 10,743,465 B2
(45) Date of Patent: *Aug. 18, 2020

(54) CENTER KNIFE DRIVE AND ROLLER ASSEMBLY FOR AN AGRICULTURAL HARVESTER

(71) Applicant: CNH Industrial America LLC, New Holland, PA (US)

(72) Inventor: David M. DeChristopher, Ephrata, PA (US)

(73) Assignee: CNH Industrial America LLC, New Holland, PA (US)

( * ) Notice: Subject to any disclaimer, the term of this patent is extended or adjusted under 35 U.S.C. 154(b) by 129 days.

This patent is subject to a terminal disclaimer.

(21) Appl. No.: 15/798,913

(22) Filed: Oct. 31, 2017

(65) Prior Publication Data

US 2019/0124831 A1    May 2, 2019

(51) Int. Cl.
*A01D 34/30* (2006.01)
*A01D 41/14* (2006.01)

(52) U.S. Cl.
CPC ........... *A01D 34/30* (2013.01); *A01D 41/142* (2013.01)

(58) Field of Classification Search
CPC ...... A01D 34/30; A01D 34/14; A01D 34/145; A01D 41/14; A01D 41/142; A01D 45/021; A01D 43/06
USPC ....... 56/257, 14.5, 10.1, 296, 293, 299, 297, 56/246, 260
See application file for complete search history.

(56) References Cited

U.S. PATENT DOCUMENTS

| | | |
|---|---|---|
| 3,074,221 A | 1/1963 | Martins |
| 3,763,638 A | 10/1973 | Vogelenzang |
| 4,198,803 A | 4/1980 | Quick et al. |
| 4,446,683 A | 5/1984 | Rempel et al. |
| 4,866,921 A * | 9/1989 | Nagashima ............ A01D 34/30 56/257 |
| 5,463,857 A | 11/1995 | Blosser |
| 6,314,707 B1 | 11/2001 | Ryan |
| 6,889,492 B1 | 5/2005 | Polk et al. |
| 7,159,378 B2 * | 1/2007 | Rickert .................. A01D 69/00 56/13.5 |

(Continued)

FOREIGN PATENT DOCUMENTS

| | | |
|---|---|---|
| EP | 2921041 A1 | 9/2015 |
| EP | 3167701 A1 | 5/2017 |

(Continued)

OTHER PUBLICATIONS

Extended European Search Report for EP Application No. 18203213.6 dated Feb. 15, 2019 (six pages).

*Primary Examiner* — Robert E Pezzuto
(74) *Attorney, Agent, or Firm* — Peter Zacharias; Patrick Sheldrake

(57) ABSTRACT

A header for an agricultural harvester comprising a frame and first and second anteriorly facing, epicyclical cutter bar knife drives connected to the frame. A roller shaft extends between and operatively connects the first and second epicyclical drives. The roller shaft operates to deliver to crop material to a header infeed conveyor. In addition, the anteriorly facing epicyclical knife drives effectively rid themselves of harmful dirt and debris thereby prolonging the service life of the epicyclical knife drives.

31 Claims, 7 Drawing Sheets

(56) References Cited

U.S. PATENT DOCUMENTS

| | | | |
|---|---|---|---|
| 7,658,059 B2 * | 2/2010 | Majkrzak | A01D 34/38 56/264 |
| 7,730,709 B2 | 6/2010 | Priepke | |
| 7,788,891 B2 | 9/2010 | Puryk et al. | |
| 8,011,272 B1 * | 9/2011 | Bich | A01D 34/305 56/299 |
| 8,151,547 B2 | 4/2012 | Bich et al. | |
| 2009/0145097 A1 * | 6/2009 | Priepke | A01D 34/30 56/257 |
| 2009/0293441 A1 * | 12/2009 | Sauerwein | A01D 57/20 56/208 |
| 2015/0305233 A1 * | 10/2015 | Surmann | A01D 34/135 56/10.1 |

FOREIGN PATENT DOCUMENTS

| | | |
|---|---|---|
| IE | 102015106087 A1 | 10/2016 |
| WO | 20120166666 A1 | 12/2012 |

* cited by examiner

CENTER KNIFE DRIVE AND ROLLER ASSEMBLY FOR AN AGRICULTURAL HARVESTER

The exemplary embodiments of present invention relate generally to a header of a plant cutting machine (e.g., a combine harvester) and, more specifically, to a header having centrally located epicyclical knife drives and a roller assembly.

BACKGROUND OF THE DISCLOSURE

An agricultural harvester e.g., a plant cutting machine, such as, but not limited to, a combine or a windrower, generally includes a header operable for severing and collecting plant or crop material as the harvester is driven over a crop field. The header has a plant cutting mechanism, e.g., a cutter bar, for severing the plants or crops via, for example, an elongate sickle mechanism that reciprocates sidewardly relative to a non-reciprocating guard structure. After crops are cut, they are collected inside the header and transported via a conveyor such as a draper belt towards a feederhouse located centrally of the header.

Epicyclical cutter bar knife drives oscillate first and second sickle mechanisms of cutter bars in opposite directions in order to cut crop. However, conventional epicyclical knife drives are disposed in a substantially horizontal orientation with substantially vertical output shafts that engage the sickle mechanism. As such, they are prone to accumulation of dirt and debris which leads to degradation of seals and premature wear of gears and other components. Moreover, conventional centrally mounted epicyclical knife drives are significantly spaced from an infeed conveyor due to their construction and orientation, which results in less efficient conveyance of cut crop to the feederhouse due to loss of crop between the knife drive and the infeed conveyor or crop stalling.

BRIEF SUMMARY OF THE DISCLOSURE

In accordance with an exemplary embodiment there is provided a header for an agricultural harvester comprising a first epicyclical drive configured to drive a first cutter bar and a second epicyclical drive configured to drive a second cutter bar. In addition, a roller shaft extends between and operatively connects the first and second epicyclical drives. The header further comprises a drive shaft that includes a gear operatively connected to at least one of the first and second epicyclical drives. The header further comprises a drive shaft that engages a rear end of the at least one of the first and second epicyclical drives. The header further comprises a drive mechanism driving rotation of at least one of the first epicyclical drive, the second epicyclical drive, and the roller shaft.

An aspect of the exemplary embodiment is that one of the first and second epicyclical drives is driven by the other of the first and second epicyclical drives via the roller shaft. The roller shaft engages a rear end of the first and second epicyclical drives. The roller shaft is a driven shaft driven by one of the first and second epicyclical drives. The roller shaft may be smooth or it may include a cover for aiding in conveying crop material, wherein the cover is at least one of a coating, a sleeve, a plurality of protrusions, a vane, a helical vane, or integrally formed structural features. Still further, the roller shaft may include moving crop engaging features like tines operatively movable by a cam or crank.

Another aspect of the exemplary embodiment is that each of the first and second epicyclical drives includes a rotatable gear assembly having a rotational axis substantially transverse to a longitudinal axis of the first cutter bar. The first epicyclical drive includes an anteriorly extending output shaft connected to the first cutter bar, and the second epicyclical drive includes an anteriorly extending output shaft connected to the second cutter bar.

Another aspect of the exemplary embodiment is that the header further comprises an infeed conveyor adjacent the roller shaft, wherein the first epicyclical drive is positioned adjacent a first lateral side of the infeed conveyor and the second epicyclical drive is positioned adjacent a second lateral side of the infeed conveyor. The infeed conveyor is spaced from the roller shaft less than about 6 inches. The roller shaft extends substantially parallel to a forward end of the infeed conveyor.

In accordance with another exemplary embodiment there is provided a header for an agricultural harvester comprising a frame, a first epicyclical drive supported by the frame and a second epicyclical drive supported by the frame, wherein an output shaft of the first epicyclical drive is connected to a first cutter bar extending in a first direction and wherein an output shaft of the second epicyclical drive is connected to a second cutter bar extending in a second direction opposite said first direction, whereby rotation of the first and second epicyclical drives causes the output shafts thereof to oscillate the first and second cutter bars in opposite directions. The header further includes a roller shaft extending between and operatively connected to the first and second epicyclical drives. The header further includes a drive mechanism configured to rotate at least one of the first epicyclical drive, the second epicyclical drive, and the roller shaft, whereby rotation of the at least one of the first epicyclical drive, the second epicyclical drive, and the roller shaft causes rotation of the others of the at least one of the first epicyclical drive, the second epicyclical drive, and the roller shaft.

The first end of the roller shaft and the first epicyclical drive are connected by a first gear set. The second end of the roller shaft and the second epicyclical drive are connected by a second gear set. The first gear set comprises a first bevel gear provided at the first end of the roller shaft and a second bevel gear provided on the first epicyclical drive. The second bevel gear set comprises a third bevel gear provided at the second end of the roller shaft and a fourth bevel gear provided on the second epicyclical drive. The drive mechanism comprises a motor or a driven drive shaft.

The header further comprises an infeed conveyor belt adjacent the roller shaft. The first and second epicyclical drives are each positioned about lateral sides of a forward end of the infeed conveyor.

In accordance with the exemplary embodiments, there is provided an epicyclical knife drive output shaft configured to drive a first cutter bar and a second epicyclical drive configured to drive a second cutter bar, wherein a roller shaft extends between and operatively connects the first and second epicyclical drives. When the subject disclosure is used in combination with an agricultural harvester, the disclosure overcomes one or more of the disadvantages referenced above by providing a header having epicyclical knife drives connected by a roller shaft, whereby the roller shaft is a rotatably driven shaft that operates to deliver to crop material to an infeed conveyor. In addition, the subject disclosure provides a header having an anteriorly facing, self-cleaning epicyclical knife drive that effectively rids itself of harmful dirt and debris thereby prolonging the service life of the epicyclical knife drive.

Other features and advantages of the subject disclosure will be apparent from the following more detail description of the exemplary embodiments.

BRIEF DESCRIPTION OF THE SEVERAL VIEWS OF THE DRAWINGS

The foregoing summary, as well as the following detailed description of the exemplary embodiments of the subject disclosure, will be better understood when read in conjunction with the appended drawings. For the purpose of illustrating the present disclosure, there are shown in the drawings exemplary embodiments. It should be understood, however, that the subject application is not limited to the precise arrangements and instrumentalities shown.

DETAILED DESCRIPTION OF THE DISCLOSURE

Figure 1:
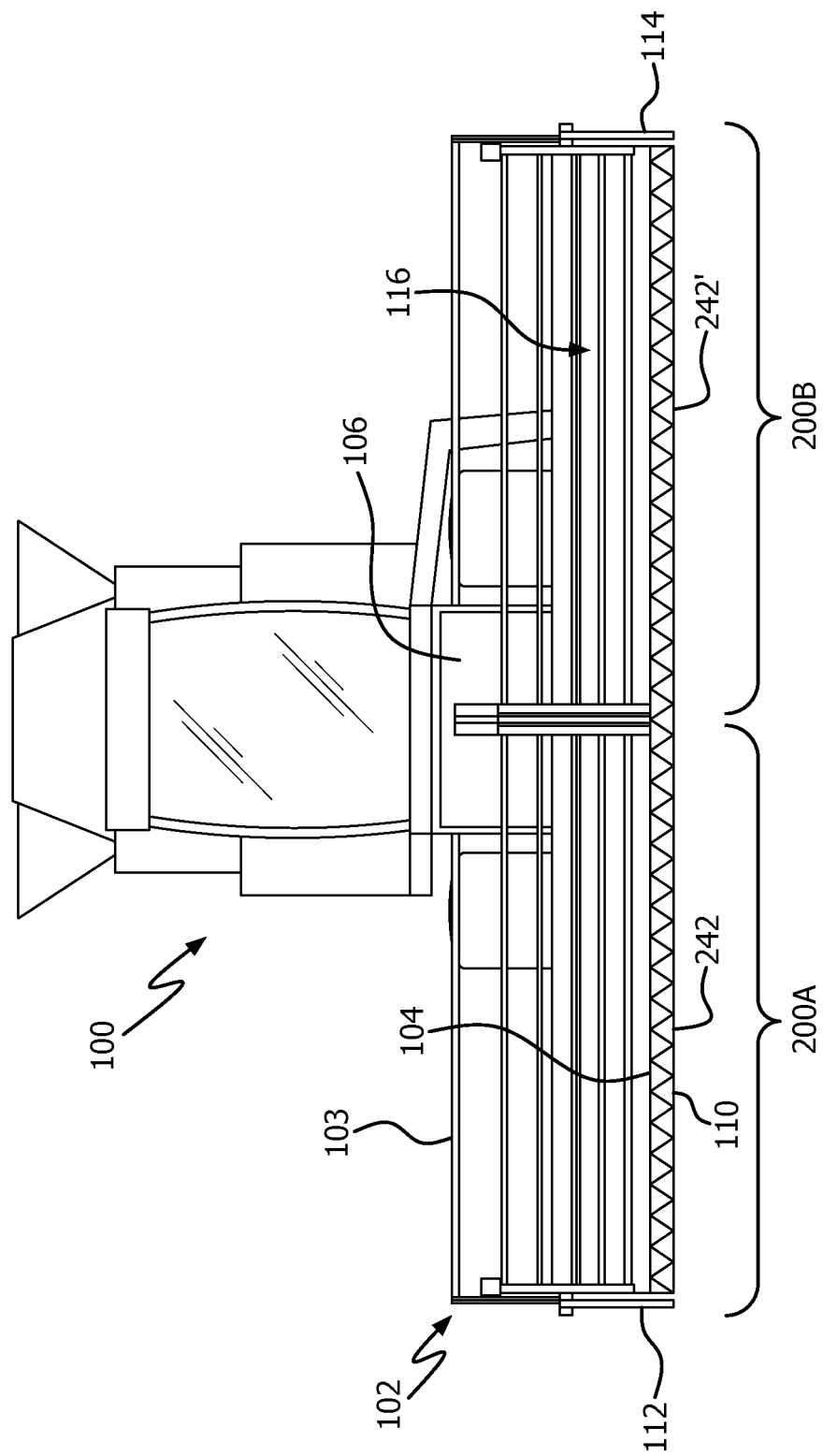
FIG. 1 is a front elevation view of an agricultural harvester including a header in accordance with an exemplary embodiment of the subject disclosure.

Reference will now be made in detail to the various exemplary embodiments of the subject disclosure illustrated in the accompanying drawings. Wherever possible, the same or like reference numbers will be used throughout the drawings to refer to the same or like features. It should be noted that the drawings are in simplified form and are not drawn to precise scale. Certain terminology is used in the following description for convenience only and is not limiting. Directional terms such as top, bottom, left, right, above, below and diagonal, are used with respect to the accompanying drawings. The term "distal" shall mean away from the center of a body. The term "proximal" shall mean closer towards the center of a body and/or away from the "distal" end. The words "inwardly" and "outwardly" refer to directions toward and away from, respectively, the geometric center of the identified element and designated parts thereof. Such directional terms used in conjunction with the following description of the drawings should not be construed to limit the scope of the subject application in any manner not explicitly set forth. Additionally, the term "a," as used in the specification, means "at least one." The terminology includes the words above specifically mentioned, derivatives thereof, and words of similar import.

The terms "grain," "ear," "stalk," "leaf," and "crop material" are used throughout the specification for convenience and it should be understood that these terms are not intended to be limiting. Thus, "grain" refers to that part of a crop which is harvested and separated from discardable portions of the crop material. The header of the subject application is applicable to a variety of crops, including but not limited to wheat, soybeans and small grains. The terms "debris," "material other than grain," and the like are used interchangeably.

"About" as used herein when referring to a measurable value such as an amount, a temporal duration, and the like, is meant to encompass variations of ±20%, ±10%, ±5%, ±1%, or ±0.1% from the specified value, as such variations are appropriate.

Throughout the subject application, various aspects thereof can be presented in a range format. It should be understood that the description in range format is merely for convenience and brevity and should not be construed as an inflexible limitation on the scope of the subject disclosure. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 2.7, 3, 4, 5, 5.3, and 6. This applies regardless of the breadth of the range.

Furthermore, the described features, advantages and characteristics of the exemplary embodiments of the subject disclosure may be combined in any suitable manner in one or more embodiments. One skilled in the relevant art will recognize, in light of the description herein, that the subject disclosure can be practiced without one or more of the specific features or advantages of a particular exemplary embodiment. In other instances, additional features and advantages may be recognized in certain embodiments that may not be present in all exemplary embodiments of the present disclosure.

Referring now to the drawings, FIG. 1 illustrates an agricultural harvester 100 in accordance with an exemplary embodiment of the present disclosure. For exemplary purposes only, the agricultural harvester is illustrated as a combine harvester. The harvester 100 includes a header 102 attached to a forward end of the harvester, which is configured to cut crops, including (without limitation) small grains (e.g., wheat, soybeans, grain, etc.), and to induct the cut crops into a feederhouse 106 as the harvester moves forward over a crop field.

The header 102 includes a frame 103 having a floor 104 that is supported in desired proximity to the surface of a crop field. First and second cutting assemblies 200A, 200B extend transversely along a forward edge of the floor 104 i.e., in a widthwise direction of the harvester. The first and second cutting assemblies 200A, 200B, described in greater detail hereinafter, are configured to cut crops in preparation for induction into the feederhouse 106. The header may include one or more draper conveyor belts for conveying cut crops to the feederhouse 106, which is configured to convey the cut crops into the harvester for threshing and cleaning as the harvester 100 moves forward over a crop field. The header 102 may include an elongated, rotatable reel 116 which extends above and in close proximity to the first and second cutting assemblies 200A, 200B. The rotatable reel 116 is configured to cooperate with the one or more draper conveyors in conveying cut crops to the feederhouse 106 for threshing and cleaning. While the foregoing aspects of the harvester are being described with respect to the header shown, the cutting assembly of the subject application can be applied to any other header having use for such a cutting assembly.

The cutting assemblies 200A, 200B extend along a forward edge 110 of the floor 104, and are generally bounded by a first side edge 112 and an opposing second side edge 114, both adjacent to the floor 104.

Figure 2:
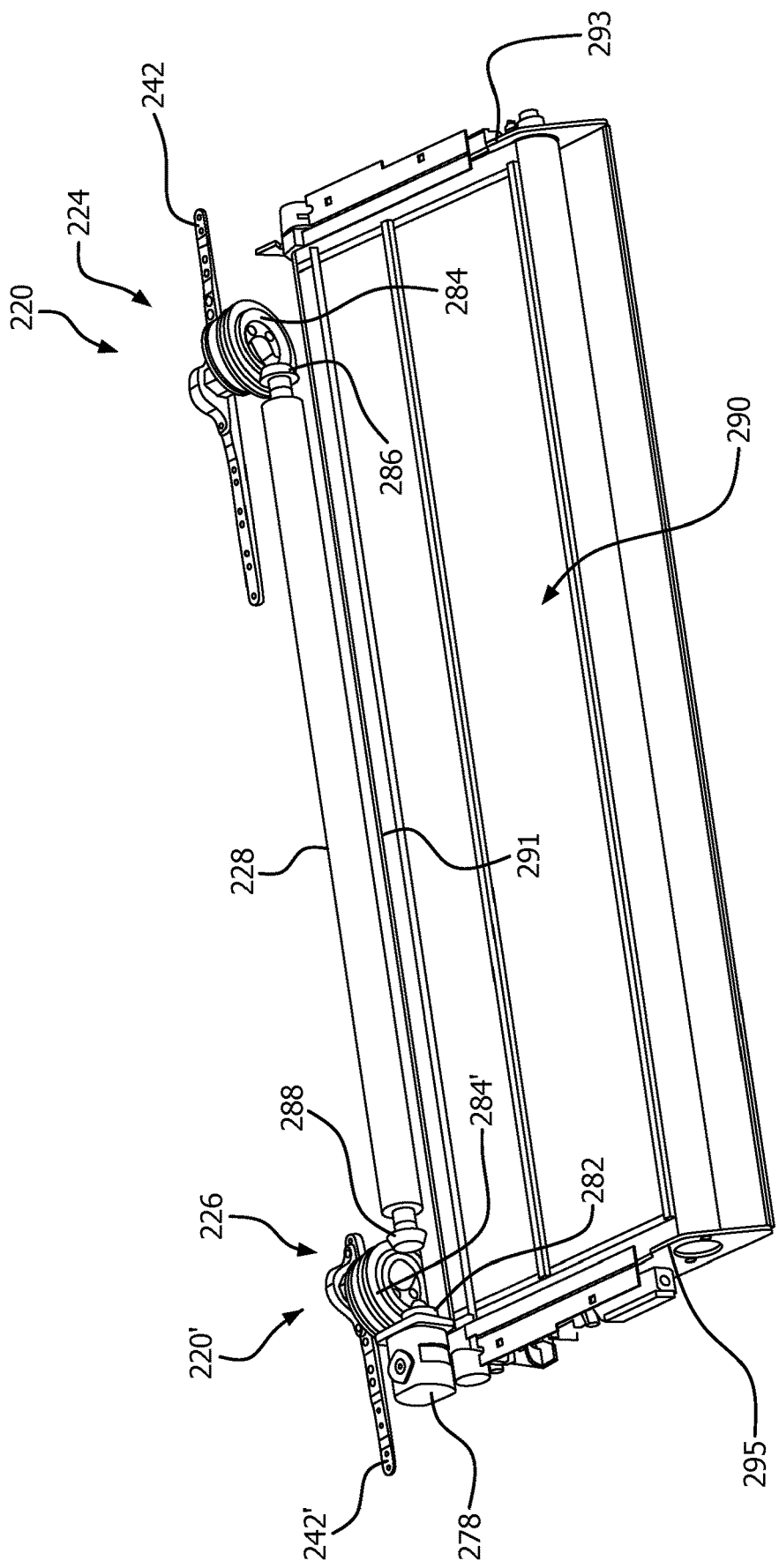
FIG. 2 is a top rear perspective view of an exemplary embodiment of a portion of a header in accordance with an exemplary embodiment of the subject disclosure with certain elements omitted for purposes of illustration.

According to an exemplary embodiment as shown in FIGS. 1 and 2, the cutting assemblies 200A, 200B include a first cutter bar 242 and a second cutter bar 242'. The cutting assemblies 200A, 200B are driven by knife drive assemblies 220, 220' that drive cutter knife heads, unillustrated in FIG. 1, in oscillating motion whereby the knife heads move laterally to the left and right. Cutter knife heads applicable to the present exemplary embodiments are disclosed, e.g., in U.S. Pat. Nos. 7,730,709 and 8,151,547, the entire disclosures of which are incorporated by reference herein in their entirety for all purposes.

Referring to FIG. 2, the knife drive assembly 220 includes a first unillustrated housing that houses a first epicyclical drive 224 supported by the frame 103 (FIG. 1) that converts rotational motion to oscillating motion to drive the first cutter bar 242 in a manner described in more detail below. The knife drive assembly 220' includes a second unillustrated housing that houses a second epicyclical drive 226 also supported by frame 103 that converts rotational motion to oscillating motion to drive the second cutter bar 242'.

A roller shaft 228 extends between and is operatively connected to the first and second epicyclical drives 224, 226. As illustrated in FIG. 2 and as further discussed below, the first and second epicyclical drives 224, 226 face in an anterior direction or substantially in an anterior direction of the header and are mounted generally centrally along the header frame on each side of the roller shaft 228.

Figure 3:
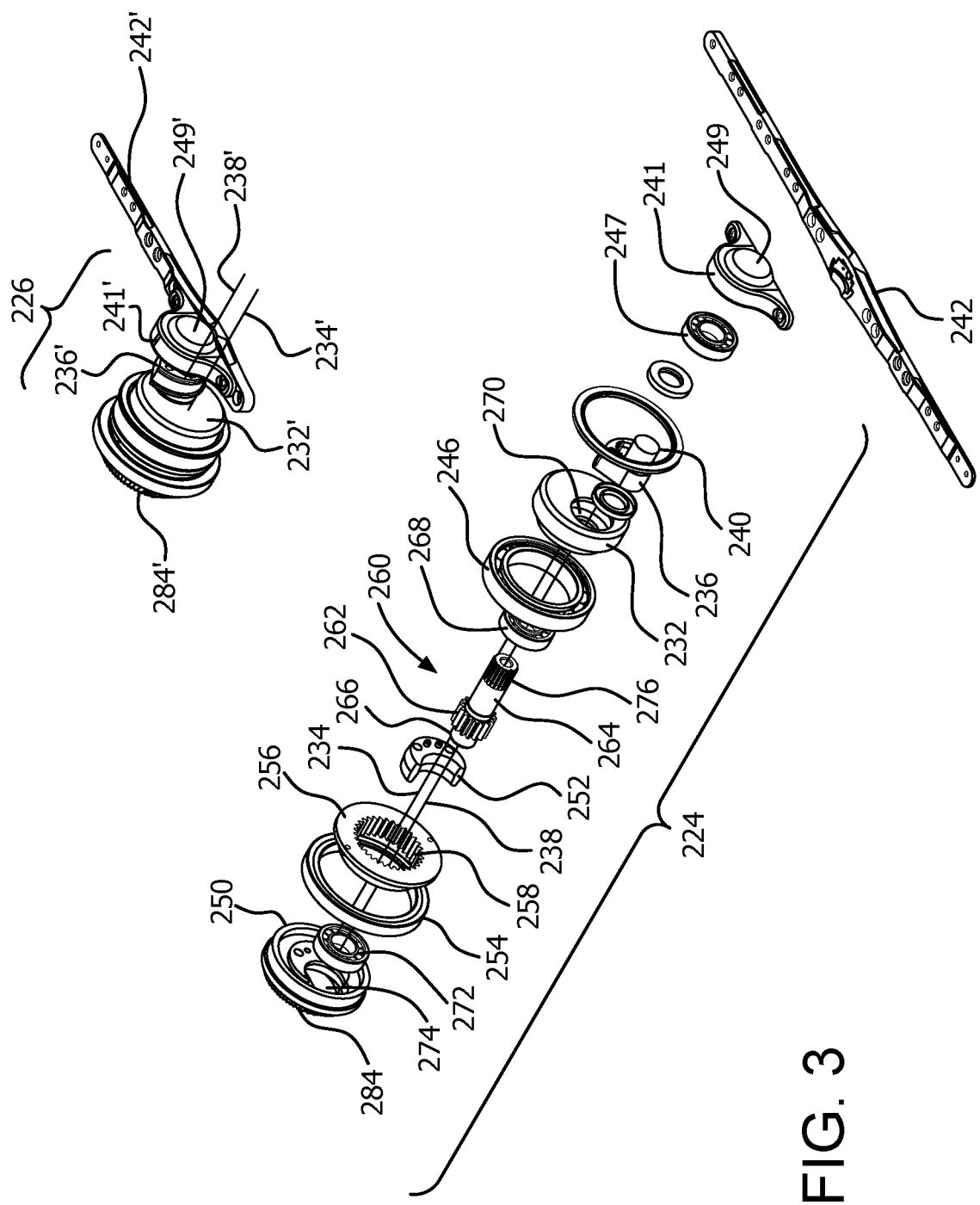
FIG. 3 is an exploded perspective view of the epicyclical knife drive assembly of FIG. 2.

Referring to FIG. 3, there is shown in an exploded perspective view the first epicyclical drive 224 and an assembled view of the second epicyclical drive 226. As seen in connection with the first epicyclical drive 224 (wherein the second epicyclical drive 226 is constructed in a mirror image-like fashion), the first epicyclical drive includes a first rotatable wheel 232 having a first central rotational axis 234. The drive further includes a first flange or planetary member 236 having a first eccentric axis 238 rotatable about the first central rotational axis 234, and a first output shaft 240 spaced from the first eccentric axis 238. Operation of the first epicyclical drive results in substantially linear oscillating motion of the output shaft in a direction transverse to the first central rotational axis 234.

Likewise, the second epicyclical drive 226 includes a second rotatable wheel 232' having a second central rotational axis 234'. The second epicyclical drive further includes a second flange or planetary member 236' having a second eccentric axis 238' rotatable about the second central rotational axis, and a second output shaft spaced from the second eccentric axis. The second output shaft is shrouded from view in FIG. 3 by a cover plate 249' of a pillow block 241' which, in turn, is attached to a cutter bar 242' in a manner described below. Operation of the second epicyclical drive results in substantially linear oscillating motion of the output shaft in a direction transverse to the second central rotational axis. So constructed and arranged, the second central rotational axis 234' is parallel to and spaced from the first central rotational axis 234. In addition, the first central rotational axis of the first rotatable wheel is parallel to the first eccentric axis of the first flange and the first output shaft, and the second central rotational axis of the second rotatable wheel is parallel to the second eccentric axis of the second flange and the second output shaft.

The first rotatable wheel 232 is mounted for rotation on an outer bearing or bushing 246 which is seated in a forwardly facing opening of a first housing (not shown). The first rotatable wheel 232 is affixed for rotation to a first rear rotatable wheel 250 via a generally crescent-shaped connector 252 by fasteners such as screws, bolts, or the like. The first rear rotatable wheel 250 is mounted for rotation in a rear outer bearing or bushing 254 which is seated in the opening of the first unillustrated housing. Situated between the first rotatable wheel 232 and the first rear rotatable wheel 250 is a stationary central gear 256 having internal gear teeth 258. A shaft 260 has external gear teeth 262 adapted to matingly engage the internal gear teeth 258 of the central gear 256. Shaft 260 has portions 264, 266 that respectively rotate in a first inner bearing or bushing 268 which resides in an opening 270 in the first rotatable wheel 232 and a rear inner bearing or bushing 272 which resides in an opening 274 in the first rear rotatable wheel 250. The forward end of shaft 260 has a splined or toothed exterior 276 that is adapted to matingly engage a similarly splined or toothed interior of the first flange 236.

As the first rear rotatable wheel 250 rotates, the shaft 260 is caused to orbit about the first central rotational axis 234. As the shaft 260 orbits about the first central rotational axis 234, its gear teeth 262 engage gear teeth 258 of the stationary central gear 256 causing counter-rotation of the shaft 260 and the first flange 236 engaged thereby. As the first flange 236 rotates, the output shaft 240 carried thereby exhibits a substantially linear oscillating motion in a direction transverse to the first central rotational axis 234.

Still referring to FIG. 3, the first rotatable wheel 232 is adjacent to the first cutter bar 242 and the second rotatable wheel 232' is adjacent to the second cutter bar 242'. Further, a distal end of the first output shaft 240 extends proud of the first flange 236 whereby the first output shaft engages the first cutter bar 242. Likewise, a distal end of the unillustrated second output shaft extends proud of the second flange 236' whereby the second output shaft engages the second cutter bar 242'. More particularly, as shown in FIG. 3, a pillow block 241 or similar structure is attached to a first cutter bar 242 by unillustrated fasteners, e.g., bolts or the like. Likewise, a pillow block 241' or similar structure is attached to a second cutter bar 242'. Pillow blocks 241, 241' define unillustrated openings for respectively receiving bearings or bushings, e.g., 247, within which are respectively received the first flange output shaft 240 and the unillustrated second flange output shaft. In this way, the first and second cutter bars 242, 242' are directly connected to the first and second flange output shafts.

The first and second cutter bars are configured, e.g., as shown in FIG. 3. That is, the first cutter bar 242 extends in a direction transverse to the first central rotational axis 234, and the second cutter bar 242' extends in a direction transverse to the second central rotational axis 234' opposite the first cutter bar. So constructed and arranged, rotation of the first and second epicyclical drives 224, 226 causes the output shafts thereof to oscillate the first and second cutter bars 242, 242' in opposite directions and along a single plane. Consequently, at one extreme in the motion of the output shafts of the first and second epicyclical drives 224, 226 the output shafts are at a minimum transverse distance from one another and at the opposite extreme the output shafts are at a maximum transverse distance from one another for purposes of vibration cancellation. As is known, vibration causes wear and tear on the various moving components of a cutter bar knife drive assembly. The present construction essentially eliminates vibration thereby effectively reducing harmful wear and tear.

As noted above, the roller shaft 228 extends between and is operatively connected to the first and second epicyclical drives 224, 226. In order to achieve effective vibration cancellation, the first and second epicyclical drives 224, 226 must be timed such that the cutter bars 242, 242' have substantially exact equal and opposite motion. Roller shaft 228 provides a timing coupling suitable to achieve this motion. Accordingly, when connected to cutter bar knife heads in the manner described below, the output shafts of the first and second epicyclical drives 224, 226 move the cutter bars back and forth in horizontal or substantially horizontal motion as the cutting knives of the cutter bars cut crop while the agricultural harvester 100 and header 102 move forwardly over a crop field.

In addition, the first and second output shafts and thus the first and second central rotational axes of the first and second epicyclical drives 224, 226 extend substantially transverse to the cutter bars 242, 242' of the header 102. That is, each of the first and second epicyclical drives 224, 226 includes a rotatable gear assembly having a rotational axis extending substantially transverse to a longitudinal axis of the first and second cutter bars 242, 242'. In other words, the first epicyclical drive 224 includes an anteriorly extending output shaft 240 connected to the first cutter bar 242, and the second epicyclical drive 226 includes an anteriorly extending output shaft (not shown) connected to the second cutter bar 242'.

Thus, the central rotational axes 234, 234' of the epicyclical drives face in an anterior or substantially anterior direction whereby the first rotatable wheels 232, 232' are oriented substantially vertically, i.e., their rotational axes being substantially horizontal. The substantially vertical orientation of the first rotatable wheels 232, 232' advantageously cause the wheels to disburse dirt and debris that strikes the wheels during operation of the agricultural harvester, thereby preventing such dirt and debris from collecting on the epicyclical drives 224, 226 and causing damage to the outer and inner bearings or bushings 254, 268. Likewise, the first and second flange output shaft bearings or bushings, e.g., 247, are protected from ingress of dirt and debris by the pillow block covers 249, 249' (FIG. 3).

As described in greater detail below, by virtue of the connection of the roller shaft 228 to the first and second epicyclical drives 224, 226, operational drive of the first or second epicyclical drive 224, 226 produces an oscillating motion in its respective flange output shaft as well as an identical but opposite oscillating motion in the flange output shaft of the other of the first and second epicyclical drive. In other words, one of the first and second epicyclical drives 224, 226 is driven by the other of the first and second epicyclical drives via the roller shaft.

Movement of the several components of the first and second epicyclical drives 224, 226 may be achieved as follows. According to an aspect, a suitable driver or drive mechanism 278 such as a motor (e.g., a hydraulic or electric motor, see FIGS. 2 and 4), a power take-off (PTO) shaft, belts, chains, a driven drive shaft or a combination of such drivers drives a drive shaft 280 (FIG. 4) extending from drive mechanism. Drive shaft 280, in turn, is operatively connected to and engages a rear end of at least one of the first and second epicyclical drives 224, 226. For instance, the drive shaft 280 includes a gear (e.g., a bevel gear) 282 operatively connected to one of the first and second epicyclical drives 224, 226 (in the illustrated example, the second epicyclical drive 226). Gear 282 engages a gear (e.g., a bevel gear) 284' affixed to second rear rotatable wheel 250' causing rotation thereof as well as second rotatable wheel 232'.

The roller shaft 228 engages a rear end of the first and second epicyclical drives 224, 226 and is a driven shaft driven by one of the first and second epicyclical drives. A first end of the roller shaft 228 and the first epicyclical drive 224 are connected by a first gear set and the second end of the roller shaft 228 and the second epicyclical drive 226 are connected by a second gear set. In particular, as shown in FIG. 2, the first gear set comprises a first bevel gear 286 provided at a first end of the roller shaft 228 and a second bevel gear 284 provided on the first epicyclical drive 224. The second gear set comprises a third bevel gear 288 provided at the second end of the roller shaft 228 and a fourth bevel gear 284' provided on the second epicyclical drive 226.

According to an aspect, the drive mechanism such as motor 278 is drivingly connected to gear 282, i.e., a fifth bevel gear, which drives the fourth bevel gear 284' carried by the second epicyclical drive 226. The fourth bevel gear 284' drives the third bevel gear 288 and thus the roller shaft 228 whose first bevel gear 286 drives the second bevel gear 284 of the first epicyclical drive 224. As a result, the first epicyclical drive 224 rotates in a direction opposite the second epicyclical drive 226. Furthermore, it will be understood that the drive mechanism 278 may be used to drive the second gear 284 instead of fourth gear 284'.

Figure 5:
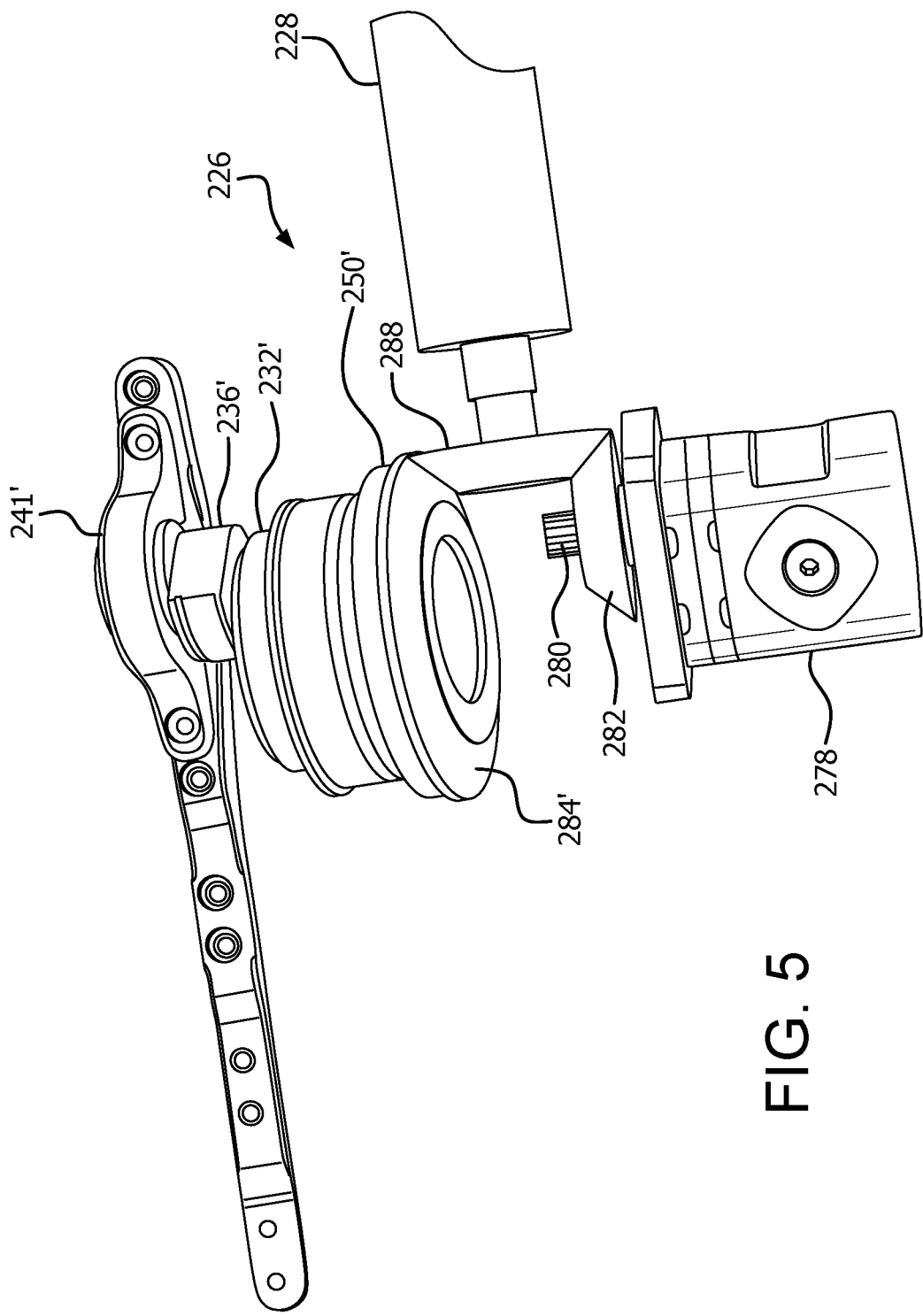
FIG. 5 is an enlarged top rear perspective view of a header in accordance with another exemplary embodiment of the subject disclosure with certain elements omitted for purposes of illustration.

Still further, the drive mechanism 278 may be disposed to directly drive rotation of the roller shaft 228 as shown in FIG. 5. That is, drive mechanism 278 may be disposed opposite the second epicyclical drive 226 such that the fifth bevel gear 282 drives the third bevel gear 288 connected to the roller shaft 228. Alternatively, it will be understood that the drive mechanism 278 may be disposed opposite the first epicyclical drive 224 such that the fifth bevel gear 282 drives the first bevel gear 286 connected to the roller shaft 228.

Referring to FIG. 6, once again the drive mechanism may be disposed to directly drive rotation of the roller shaft 228. As illustrated, roller shaft 228 may be directly connected to bevel gear 282 which is driven by drive mechanism 278, thereby eliminating the need for bevel gear 288 of FIGS. 2 and 4. The result of such an arrangement is that the second epicyclical drive 226 and the first epicyclical drive 224 are driven to rotate in the same direction rather than opposite directions.

In other words, the drive mechanism 278 may drive rotation of at least one of the first epicyclical drive 224, the second epicyclical drive 226, and the roller shaft 228, and rotation of the at least one of the first epicyclical drive, the second epicyclical drive, and the roller shaft causes rotation of the others of the at least one of the first epicyclical drive, the second epicyclical drive, and the roller shaft.

Referring back to FIG. 2, the frame 103 supports an infeed conveyor 290 (FIGS. 2 and 4) adjacent the roller shaft 228. According to an aspect, the roller shaft extends substantially parallel to a forward end 291 of the infeed conveyor and the infeed conveyor is spaced a distance "D" from the roller shaft less than about 12, 11, 10, 9, 8, 7 inches and preferably less than about 6, 5, 4, 3, 2, 1 inches. It will be understood that the roller shaft 228 is driven in the same direction as the infeed conveyor 290 in order to convey crop material from the cutter bars to the infeed conveyor.

According to an aspect, the first epicyclical 224 drive is positioned adjacent or about a first lateral side 293 of the infeed conveyor and the second epicyclical drive 226 is positioned adjacent or about a second lateral side 295 of the infeed conveyor adjacent the forward end 291 of the infeed conveyor.

Figure 4:
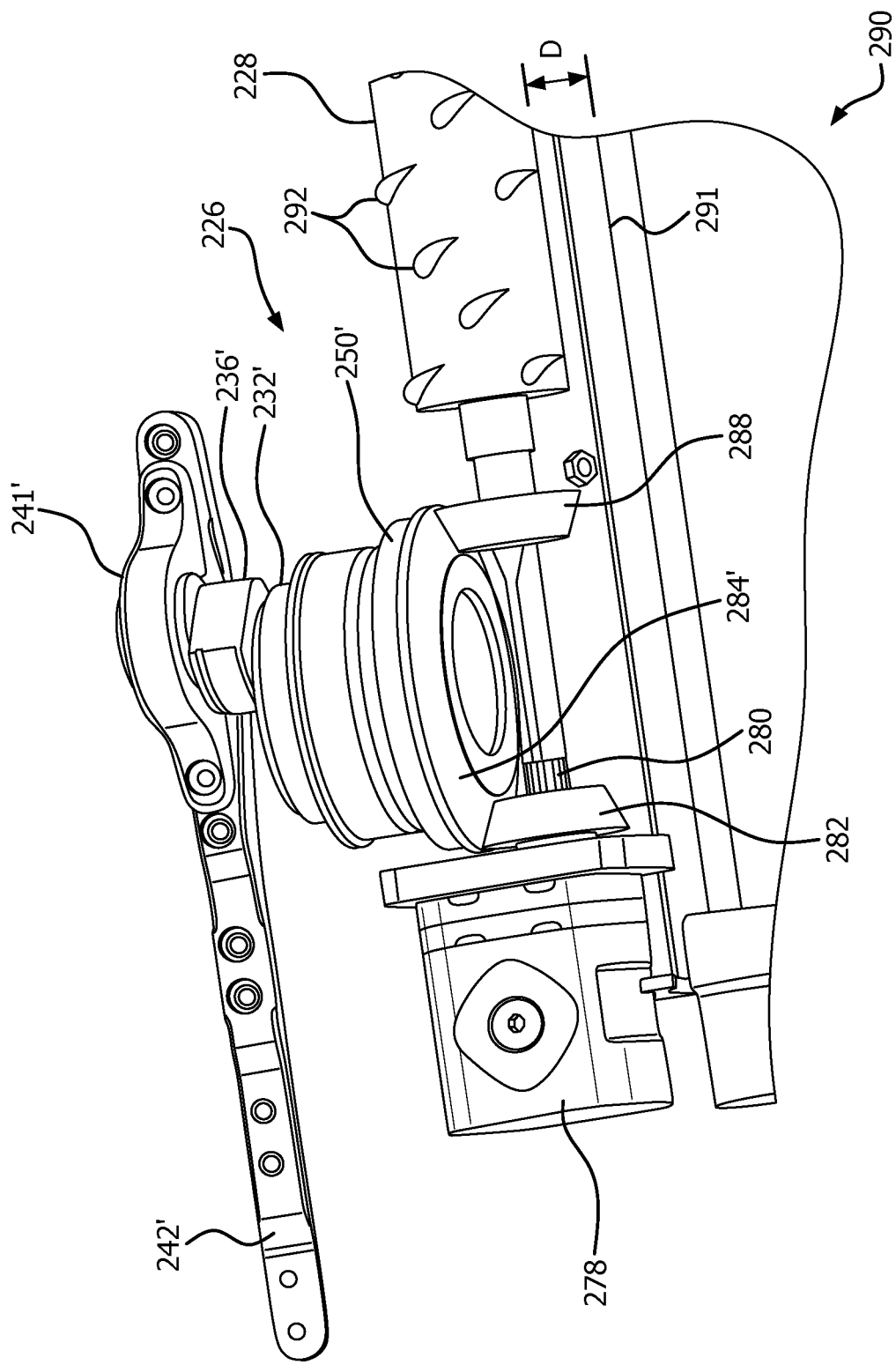
FIG. 4 is an enlarged top rear perspective view of the header of FIG. 2 with certain elements omitted for purposes of illustration.
Figure 6:
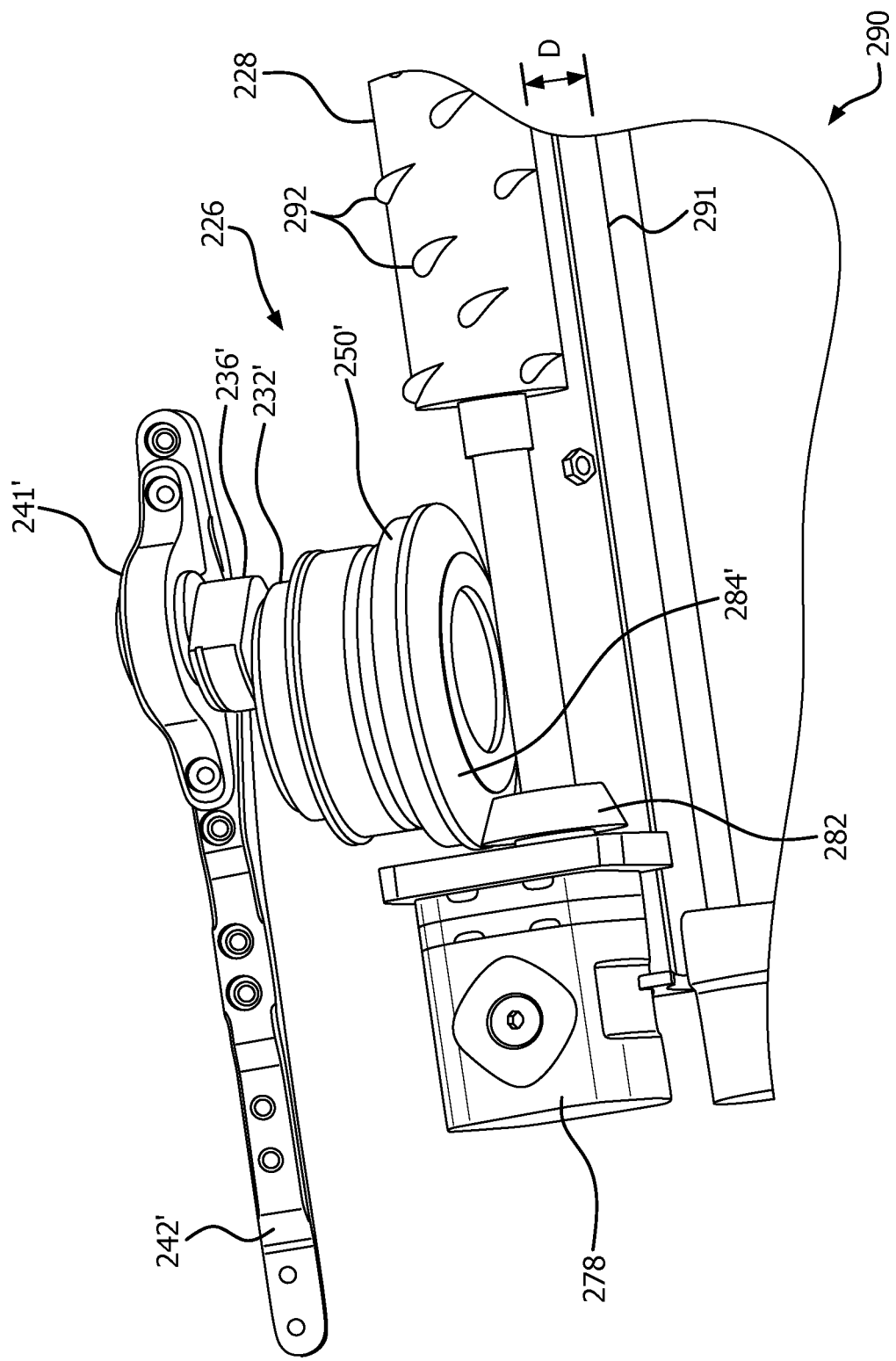
FIG. 6 is an enlarged top rear perspective view of a header in accordance with another exemplary embodiment of the subject disclosure with certain elements omitted for purposes of illustration.
Figure 7A:
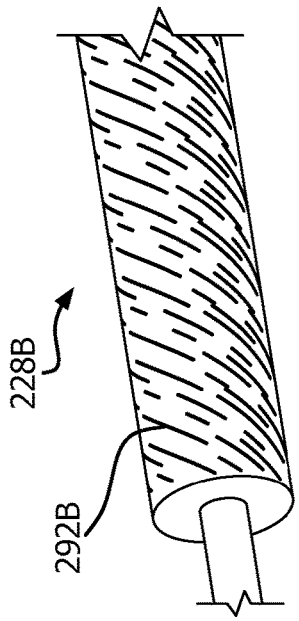
FIGS. 7A, 7B, 7C, 7D and 7E are partial perspective views of several embodiments of a roller shaft in accordance with the subject disclosure.
Figure 7B:
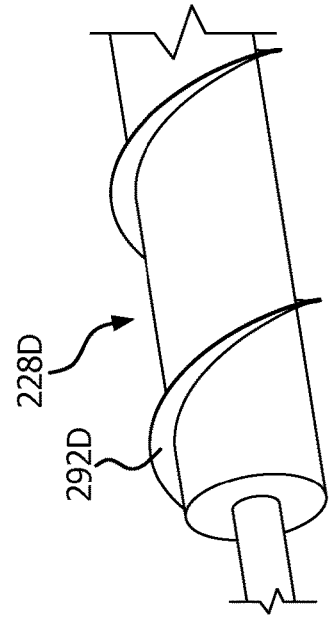
Figure 7C:
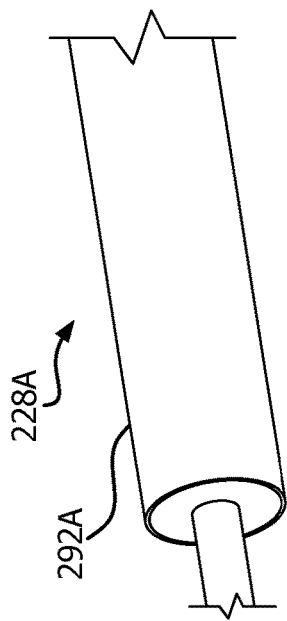
Figure 7D:
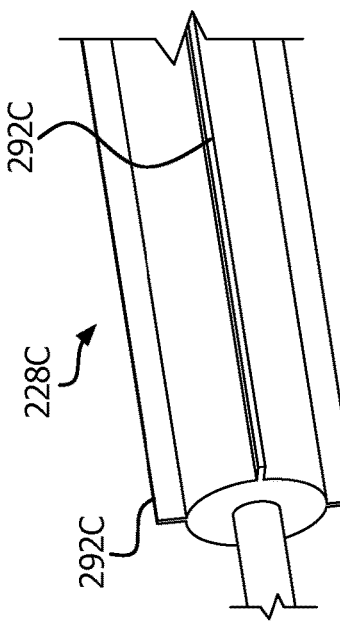
Figure 7E:
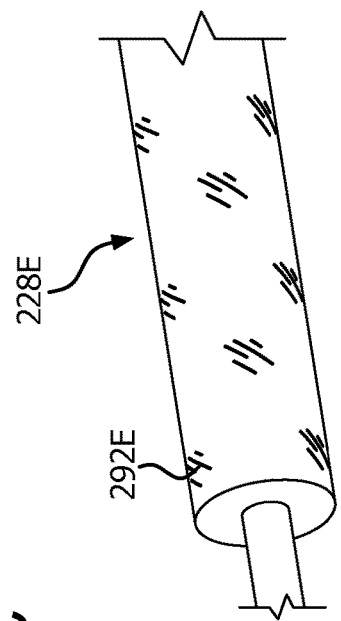

As shown in FIGS. 4, 5, 6 and 7A-7E, the roller shaft 228 may be smooth (FIG. 5) or may optionally include a cover for aiding in conveying crop material from the cutter bars to the infeed conveyor 290 during operation of the agricultural harvester. The cover can be configured as a coating, a sleeve, a plurality of protrusions, a vane, a helical vane, or integrally formed structural features. For example, as shown in FIGS. 4 and 6, roller shaft 228 includes a cover 292 that comprises a plurality of protrusions. In FIG. 7A, the roller shaft 228A includes a cover 292A formed as a sleeve. In FIG. 7B, the roller shaft 228B includes a cover 292B formed as integrally formed structural features. In FIG. 7C, the roller shaft 228C includes a cover 292C formed as one or more straight vanes extending longitudinally of the roller shaft. In FIG. 7D, the roller shaft 228D includes a cover 292D formed as a helical vane. In FIG. 7E, the roller shaft 228E includes a cover 292E formed as a coating. It will be understood that sleeve 292A or coating 292E may be made of high-friction materials including, without limitation, elastomeric material and coarse granular material to promote conveyance of cut crop from the cutter bars to the infeed conveyor 290. Still further, the roller shaft may include moving crop engaging features like tines operatively movable by a cam or crank.

In addition, it is understood the roller shaft 228 could be constructed as a single roller or built up of two or more rollers connected end-to-end in order to transmit motion between the first and second epicyclical drives. Similarly, the roller could be fabricated as one piece or constructed of a through shaft inside a tube with the tube ends necking down to the through shaft.

According to the exemplary embodiments of the subject disclosure, a header is provided that has epicyclical knife drives connected by a roller shaft to so as to rotate in the same or opposite directions, whereby the roller shaft operates to deliver to crop material to an infeed conveyor. Moreover, by virtue of the substantially anterior facing arrangement of the epicyclical drives according to the subject disclosure, the vertically oriented first and second rotatable wheels with their substantially horizontal output shafts effectively disburse dirt and debris from the drives, thereby keeping bearings and seals cleaner and prolonging the service lives of the epicyclical drives.

It will be appreciated by those skilled in the art that changes could be made to the exemplary embodiments described above without departing from the broad inventive concept thereof. It is to be understood, therefore, that this disclosure is not limited to the particular embodiments disclosed, but it is intended to cover modifications within the spirit and scope of the subject disclosure as defined by the appended claims.

I claim:

1. A header for an agricultural harvester comprising:
a first epicyclical drive configured to drive a first cutter bar;
a second epicyclical drive configured to drive a second cutter bar; and
a roller shaft having a longitudinal axis substantially parallel to the first and second cutter bars and extending between and operatively connected to the first and second epicyclical drives,
wherein one of the first and second epicyclical drives is driven by the other of the first and second epicyclical drives via the roller shaft.

2. The header of claim 1, further comprising a drive shaft that includes a gear operatively connected to at least one of the first and second epicyclical drives.

3. The header of claim 1, further comprising a drive shaft that engages a rear end of at least one of the first and second epicyclical drives.

4. The header of claim 1, wherein the roller shaft engages a rear end of the first and second epicyclical drives.

5. The header of claim 1, wherein the roller shaft is a driven shaft driven by one of the first and second epicyclical drives.

6. The header of claim 1, wherein the roller shaft includes a cover for aiding in conveying crop material.

7. The header of claim 6, wherein the cover is at least one of a coating, a sleeve, a plurality of protrusions, a vane, a helical vane, or integrally formed structural features.

8. The header of claim 1, wherein each of the first and second epicyclical drives includes a rotatable gear assembly having a rotational axis substantially transverse to a longitudinal axis of the first cutter bar.

9. The header of claim 1, wherein the first epicyclical drive includes an anteriorly extending output shaft connected to the first cutter bar, and the second epicyclical drive includes an anteriorly extending output shaft connected to the second cutter bar.

10. The header of claim 1, further comprising a drive mechanism driving rotation of at least one of the first epicyclical drive, the second epicyclical drive, and the roller shaft.

11. The header of claim 1, further comprising:
an infeed conveyor adjacent the roller shaft; and
wherein the first epicyclical drive is positioned adjacent a first lateral side of the infeed conveyor and the second epicyclical drive is positioned adjacent a second lateral side of the infeed conveyor.

12. The header of claim 11, wherein the infeed conveyor is spaced from the roller shaft less than about 6 inches.

13. The header of claim 11, wherein the roller shaft extends substantially parallel to a forward end of the infeed conveyor.

14. A header for an agricultural harvester comprising:
a frame;
a first epicyclical drive supported by the frame and a second epicyclical drive supported by the frame, wherein an output shaft of the first epicyclical drive is connected to a first cutter bar extending in a first direction and wherein an output shaft of the second epicyclical drive is connected to a second cutter bar extending in a second direction opposite said first direction, whereby rotation of the first and second epicyclical drives causes the output shafts thereof to oscillate the first and second cutter bars in opposite directions;
a roller shaft having a longitudinal axis substantially transverse to a rotational axis of at least one of the first and second epicyclical drives and extending between and operatively connected to the first and second epicyclical drives; and
a drive mechanism configured to rotate at least one of the first epicyclical drive, the second epicyclical drive, and the roller shaft, whereby rotation of the at least one of the first epicyclical drive, the second epicyclical drive, and the roller shaft causes rotation of the others of the at least one of the first epicyclical drive, the second epicyclical drive, and the roller shaft,
wherein a first end of the roller shaft and the first epicyclical drive are connected by a first gear set, and wherein a second end of the roller shaft and the second epicyclical drive are connected by a second gear set.

15. The header of claim 14, wherein the first gear set comprises a first bevel gear provided at the first end of the roller shaft and a second bevel gear provided on the first epicyclical drive, and wherein the second gear set comprises a third bevel gear provided at the second end of the roller shaft and a fourth bevel gear provided on the second epicyclical drive.

16. The header of claim 14, wherein the drive mechanism comprises a motor or a driven drive shaft.

17. The header of claim 15, further comprising an infeed conveyor belt adjacent the roller shaft, and wherein the first and second epicyclical drives are each positioned about lateral sides of a forward end of the infeed conveyor.

18. The header of claim 14, wherein the first and second epicyclical drives rotate in either the same direction or in opposite directions.

19. A header for an agricultural harvester comprising:
a first epicyclical drive configured to drive a first cutter bar;
a second epicyclical drive configured to drive a second cutter bar; and
a roller shaft having a first lateral end directly engaging the first epicyclical drive and a second lateral end directly engaging the second epicyclical drive.

20. The header of claim 19, further comprising a drive shaft that includes a gear operatively connected to at least one of the first and second epicyclical drives.

21. The header of claim 19, further comprising a drive shaft that engages a rear end of at least one of the first and second epicyclical drives.

22. The header of claim 19, wherein the roller shaft engages a rear end of the first and second epicyclical drives.

23. The header of claim 19, wherein the roller shaft is a driven shaft driven by one of the first and second epicyclical drives.

24. The header of claim 19, wherein the roller shaft includes a cover for aiding in conveying crop material.

25. The header of claim 24, wherein the cover is at least one of a coating, a sleeve, a plurality of protrusions, a vane, a helical vane, and integrally formed structural features.

26. The header of claim 19, wherein each of the first and second epicyclical drives includes a rotatable gear assembly having a rotational axis substantially transverse to a longitudinal axis of the first cutter bar.

27. The header of claim 19, wherein the first epicyclical drive includes an anteriorly extending output shaft connected to the first cutter bar, and the second epicyclical drive includes an anteriorly extending output shaft connected to the second cutter bar.

28. The header of claim 19, further comprising a drive mechanism driving rotation of at least one of the first epicyclical drive, the second epicyclical drive, and the roller shaft.

29. The header of claim 19, further comprising:
an infeed conveyor adjacent the roller shaft; and
wherein the first epicyclical drive is positioned adjacent a first lateral side of the infeed conveyor and the second epicyclical drive is positioned adjacent a second lateral side of the infeed conveyor.

30. The header of claim 29, wherein the infeed conveyor is spaced from the roller shaft less than about 6 inches.

31. The header of claim 29, wherein the roller shaft extends substantially parallel to a forward end of the infeed conveyor.

* * * * *